United States Patent
Worth

(10) Patent No.: US 12,443,885 B1
(45) Date of Patent: Oct. 14, 2025

(54) APPARATUS AND METHOD FOR DATABASE MANAGEMENT OF MACHINE LEARNING MODELS

(71) Applicant: Substrate Artificial Intelligence SA, Madrid (ES)

(72) Inventor: James Brennan Worth, Casetllón de la Plana (ES)

(73) Assignee: Substrate Artificial Intelligence SA, Madrid (ES)

( * ) Notice: Subject to any disclaimer, the term of this patent is extended or adjusted under 35 U.S.C. 154(b) by 0 days.

(21) Appl. No.: 18/430,194

(22) Filed: Feb. 1, 2024

Related U.S. Application Data

(60) Provisional application No. 63/482,817, filed on Feb. 2, 2023.

(51) Int. Cl.
*G06N 20/00* (2019.01)
*G06F 16/23* (2019.01)
*G06F 16/2455* (2019.01)

(52) U.S. Cl.
CPC ......... *G06N 20/00* (2019.01); *G06F 16/2379* (2019.01); *G06F 16/2455* (2019.01)

(58) Field of Classification Search
CPC .. G06N 20/00; G06F 16/2379; G06F 16/2455
See application file for complete search history.

(56) References Cited

U.S. PATENT DOCUMENTS

| | | | |
|---|---|---|---|
| 9,959,507 B2 | 5/2018 | Mathur et al. | |
| 10,354,342 B2 | 7/2019 | Kuper et al. | |
| 11,580,455 B2 * | 2/2023 | Sarferaz | G06Q 30/0202 |
| 11,734,614 B1 * | 8/2023 | Wang | G06Q 30/016 |
| | | | 706/12 |
| 11,763,154 B1 | 9/2023 | Lupesko et al. | |
| 11,889,819 B2 | 2/2024 | Worth | |
| 12,156,512 B2 | 12/2024 | Worth | |
| 12,304,081 B2 | 5/2025 | Kuo et al. | |
| 2002/0004098 A1 | 1/2002 | Dahlen et al. | |
| 2014/0116341 A1 | 5/2014 | Kopic et al. | |
| 2016/0007565 A1 | 1/2016 | Trottier et al. | |

(Continued)

OTHER PUBLICATIONS

Baumeister, R. F. et al., "Do Conscious Thoughts Cause Behavior?," Annu. Rev. Psychol., Jan. 10, 2011, vol. 62, pp. 331-361.

(Continued)

*Primary Examiner* — Robert W Beausoliel, Jr.
*Assistant Examiner* — Mohammad S Bhuyan
(74) *Attorney, Agent, or Firm* — COOLEY LLP

(57) ABSTRACT

In an embodiment, a method includes updating a first model storage that includes a first plurality of machine learning (ML) models to generate a second model storage that includes a second plurality of ML models. The second plurality of ML models is different than the first plurality of ML models. A representation of a request is received. A set of attributes associated with the request is identified. The second model storage is filtered, based on the set of state features, to identify a subset of ML models included in the second model storage. Each model from the subset of ML models is associated with at least one attribute from the set attributes. The request is caused to be processed using the subset of ML models to generate an output.

22 Claims, 7 Drawing Sheets

(56) References Cited

U.S. PATENT DOCUMENTS

| | | | |
|---|---|---|---|
| 2016/0324126 A1 | 11/2016 | Johnston et al. | |
| 2019/0114078 A1* | 4/2019 | Oh | G06F 3/0632 |
| 2019/0371426 A1 | 12/2019 | Embree et al. | |
| 2020/0113158 A1 | 4/2020 | Rishi et al. | |
| 2020/0169400 A1 | 5/2020 | Thaler, III et al. | |
| 2020/0176088 A1 | 6/2020 | Kanamarlapudi et al. | |
| 2020/0194126 A1 | 6/2020 | Lim et al. | |
| 2020/0279025 A1* | 9/2020 | Owen | G06N 3/08 |
| 2020/0332013 A1 | 10/2020 | Weber et al. | |
| 2022/0083445 A1* | 3/2022 | Nyati | G06F 11/3452 |
| 2022/0114495 A1* | 4/2022 | Nurvitadhi | G06N 9/5044 |
| 2022/0284352 A1* | 9/2022 | Chang | G06N 20/00 |
| 2022/0310271 A1 | 9/2022 | Cheung et al. | |
| 2023/0032822 A1* | 2/2023 | Wang | G06N 20/20 |
| 2023/0098374 A1 | 3/2023 | Worth | |
| 2023/0101777 A1 | 3/2023 | Worth | |
| 2023/0103420 A1 | 4/2023 | Worth | |
| 2023/0123322 A1 | 4/2023 | Cella et al. | |
| 2023/0214925 A1 | 7/2023 | Cella et al. | |
| 2024/0028948 A1 | 1/2024 | Worth | |
| 2024/0127062 A1 | 4/2024 | Muller et al. | |
| 2024/0177216 A1 | 5/2024 | Xiong et al. | |
| 2024/0224944 A1 | 7/2024 | Worth | |
| 2024/0289639 A1 | 8/2024 | Worth | |
| 2024/0310860 A1 | 9/2024 | Van De Velde et al. | |
| 2024/0320444 A1 | 9/2024 | Maschmeyer et al. | |
| 2024/0394556 A1* | 11/2024 | Shao | G06F 9/48 |
| 2024/0427321 A1 | 12/2024 | Gupta et al. | |
| 2025/0111280 A1 | 4/2025 | Li et al. | |

OTHER PUBLICATIONS

Bechara, A. et al., "Emotion, Decision Making and the Orbitofrontal Cortex," Cerebral Cortex, Mar. 2000, vol. 10, Issue 3, pp. 295-307.

Bhatt, S., "Reinforcement learning 101," Mar. 2018, [online], Retrieved from the Internet: https://towardsdatascience.com/reinforcement-learning-101-e24b50e1d292 , 8 pages.

Borchers, M. R. et al., "Machine-learning-based calving prediction from activity, lying, and ruminating behaviors in dairy cattle," J. Dairy Sci., Jul. 2017, vol. 100, No. 7, pp. 5664-5674.

Chica, A. B. et al., "Attentional Routes to Conscious Perception," Frontiers in Psychology, Jan. 2012, vol. 3, Article 1, pp. 1-12.

Chun, M. M. et al., "Memory: Enduring traces of perceptual and reflective attention," Neuron, Nov. 2011, vol. 72, No. 4, pp. 520-535.

Egger, D. J. et al., "Credit Risk Analysis Using Quantum Computers," IEEE Transactions on Computers, Dec. 2021. vol. 70, No. 12, pp. 2136-2145.

Flet-Berliac, Y., "The Promise of Hierarchical Reinforcement Learning," The Gradient, Mar. 2019, 30 pages.

Fukuda, K. et al., "Quantity, not quality: The relationship between fluid intelligence and working memory capacity," Psychonomic Bulletin & Review, Oct. 2010, vol. 17, No. 5, pp. 673-679.

Girard, N., "Characterizing strategic patterns of farms with knowledge-based temporal abstraction: The case of suckler sheep farms," AI Applications, 1996, Abstract published online Aug. 6, 1997, vol. 10, No. 3, pp. 41-55.

Huang, J. et al., "Hyperparameter Auto-tuning in Self-Supervised Robotic Learning," IEEE Robotics and Automation Letters (RAL), Mar. 2021, presented at ICRA 2021 and NeurIPS 2020 DRL Workshop, 8 pages.

Kebreab, E. et al., "A new modeling environment for integrated dairy system management," Animal Frontiers, Apr. 2019, vol. 9, No. 2, pp. 25-32.

Koziol, L. F. et al., "Consensus Paper: The Cerebellum's Role in Movement and Cognition," Cerebellum, Feb. 2014, vol. 13, No. 1, pp. 151-177.

Liakos, K. G. et al., "Machine Learning in Agriculture: A Review," Sensors, Aug. 14, 2018, vol. 18, No. 2674, 29 pages.

Liebe, D. M. et al., "Analytics in sustainable precision animal nutrition," Animal Frontiers, Apr. 2019, vol. 9, Issue 2, pp. 16-24.

Liessner, R. et al., "Hyperparameter Optimization for Deep Reinforcement Learning in Vehicle Energy Management," In Proceedings of the 11th International Conference on Agents and Artificial Intelligence (ICAART), Feb. 2019, pp. 134-144.

Lockwood, O. et al., "Reinforcement Learning with Quantum Variational Circuits," Proceedings of the Sixteenth AAAI Conference on Artificial Intelligence and Interactive Digital Entertainment (AIIDE-20), Oct. 1, 2020, pp. 245-251.

Marchetti, G., "Against the view that consciousness and attention are fully dissociable," Frontiers in Psychology, Feb. 2012, vol. 3, Article 36, pp. 1-14.

McCabe, D. P. et al., "The Relationship Between Working Memory Capacity and Executive Functioning: Evidence for a Common Executive Attention Construct," Neuropsychology, Mar. 2010, vol. 24, No. 2, pp. 222-243.

McKnight, L. et al., "Modeling of livestock systems to enhance efficiency," Animal Frontiers, Apr. 2019, vol. 9, Issue 2, pp. 3-5.

Morota, G. et al., "Big Data Analytics and Precision Animal Agriculture Symposium: Machine learning and data mining advance predictive big data analysis in precision animal agriculture," J. Anim. Sci., Apr. 14, 2018, vol. 96, pp. 1540-1550.

Muzzio, I. A. et al., "What is remembered? Role of attention on the encoding and retrieval of hippocampal representations," J Physiol., Jun. 15, 2009, vol. 15, No. 587(Pt 12), pp. 2837-2854.

Neary, P. L., "Automatic Hyperparameter Tuning in Deep Convolutional Neural Networks Asynchronous Reinforcement Learning," 2018 IEEE International Conference on Cognitive Computing (ICCC), Jul. 2018, 5 pages.

NIPS 2007 Workshop, Hierarchical Organization of Behavior, Dec. 2007, 12 pages.

Rebentrost, P. et al., "Quantum computational finance: quantum algorithm for portfolio optimization," arXiv preprint arXiv: 1811.03975 [Online], Nov. 2018, 818 pages.

Stamatopoulos, N. et al., "Option Pricing using Quantum Computers," arXiv:1905.02666 [Online], Feb. 18, 2020, pp. 1-20.

Suparwito, H. et al., "A Hierarchical Classification Method Used to Classify Livestock Behaviour from Sensor Data," In: Multidisciplinary Trends in Artificial Intelligence: 13th Intl. Conference, R. Chamchong and K. W. Wong (Eds.): MIWAI 2019, Nov. 2019, pp. 204-215.

Sutton, R. S. et al., "Between MDPs and semi-MDPs: A framework for temporal abstraction in reinforcement learning," Artificial Intelligence, Aug. 1999, vol. 112, pp. 181-211.

Sutton, R. S. et al., "Reinforcement Learning: An Introduction," Second Edition, in progress, A Bradford Book, The MIT Press, Cambridge, Massachusetts, Copyright 2018, 352 pages.

Valletta, J. J. et al., "Applications of machine learning in animal behaviour studies," Animal Behavior, Feb. 1, 2017, vol. 124, pp. 203-220.

Wanga, H. P. et al., "Designing a machine learning—based framework for enhancing performance of livestock mobile application system," American Journal of Software Engineering and Applications, Apr. 2015, vol. 4, No. 3, pp. 56-64.

* cited by examiner

APPARATUS AND METHOD FOR DATABASE MANAGEMENT OF MACHINE LEARNING MODELS

CROSS REFERENCE TO RELATED APPLICATION

This application claims priority to and the benefit of U.S. Provisional Patent Application No. 63/482,817, filed Feb. 2, 2023 and titled "APPARATUS AND METHOD FOR DATABASE MANAGEMENT OF MACHINE LEARNING MODELS," the contents of which are incorporated herein by reference in its entirety.

FIELD

In an embodiment, a database of machine learning models is updated to include new models, delete undesirable models, and/or update existing models.

BACKGROUND

Cyber-attacks can represent a constant and evolving hazard in one's ability to work, play, and learn on the Internet. Much of today's technologies are increasingly dependent on the use of machine learning (ML) to automate and create highly scalable services. This can increase, however, the risk of bad actors who create exploits of these services for personal gain or disruptive purposes. Adversarial attacks, for example, can threaten the stability and reliability of deployed ML solutions in areas such as image processing and Natural Language Processing (NLP). This can include, for example, bypassing spam filters for emails, not safe for work (NSFW) content filters, self-driving vehicles, and more. These exploits can run from annoyance to threatening the health and safety of people. While there are some known approaches to defend against some of these attacks, attacks and/or attackers are constantly evolving. Therefore, there exists a need for a system that can defend against these attacks and evolve as attacks evolve, while maintaining computational efficiency and stability.

SUMMARY

In an embodiment, a method includes updating a first model storage that includes a first plurality of machine learning (ML) models to generate a second model storage that includes a second plurality of ML models. The second plurality of ML models is different than the first plurality of ML models. A representation of a request is received. A set of attributes associated with the request is identified. The second model storage is filtered, based on the set of attributes, to identify a subset of ML models included in the second model storage. The subset of ML models can include multiple ML models from the second model storage. Each ML model from the subset of ML models is associated with at least one attribute from the set of attributes. The request is processed using the subset of ML models to generate an output.

DETAILED DESCRIPTION

Figure 1:
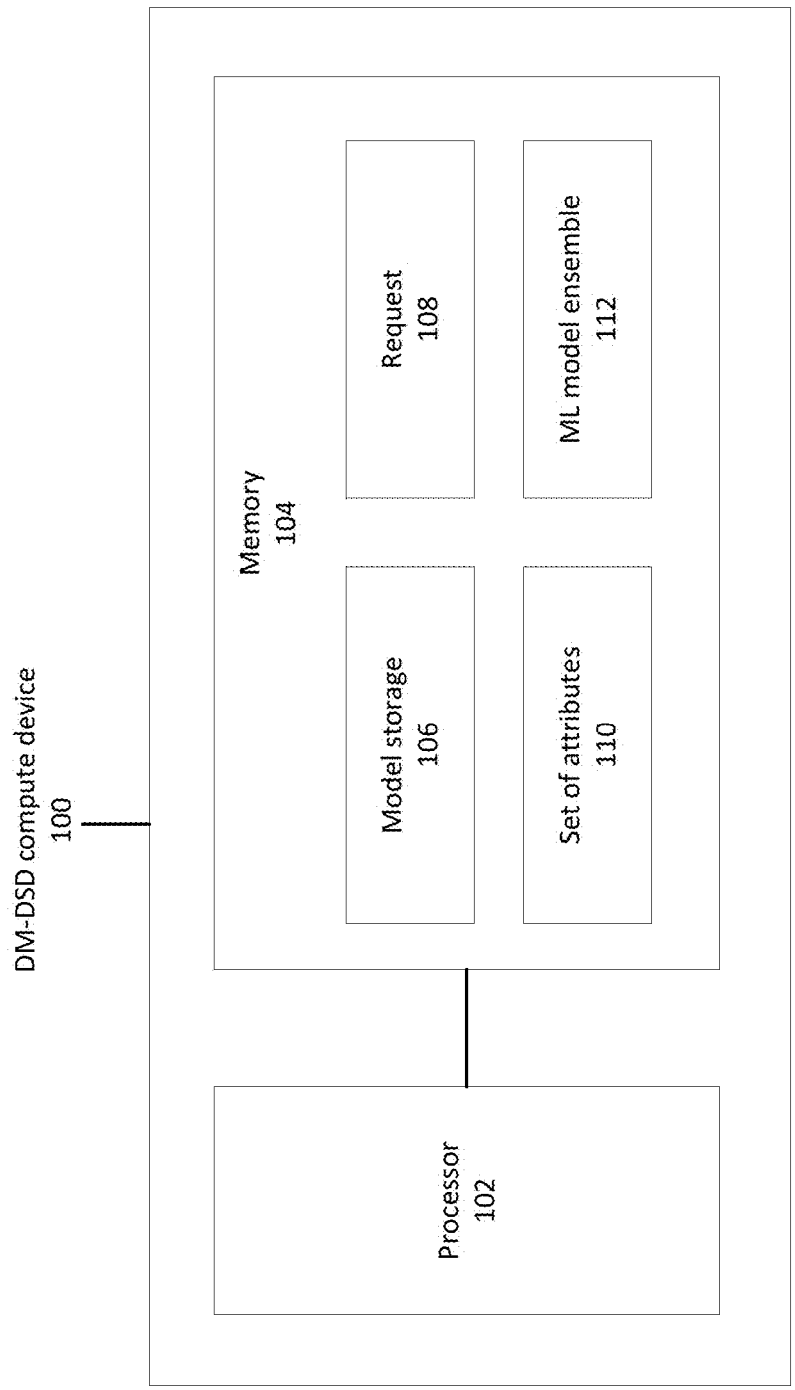
FIG. 1 shows a block diagram of a distributed model with dynamic spatial decomposition (DM-DSD) compute device, according to an embodiment.

In some implementations, a "state feature" refers to an individual measurable property or characteristic. In some implementations, a "state feature" refers to an attribute or aspect of an object (e.g., a request, a machine learning model, etc.). In some implementations, a "vector" refers to a point or array with only one dimension. In some implementations, a "vector" refers to an input and/or portion of an input (e.g., after the input is split into multiple parts), and can have a size limit. In some implementations, a "vector" can represent attributes associated with a machine learning model, such as the machine learning model's size, the machine learning model's type, the machine learning model's function, and/or the like.

Some implementations are related to a distributed model with dynamic spatial decomposition (DM-DSD) system. The DM-DSD system can support the training and serving of models in a scalable and future-proofed architecture while improving (e.g., optimizing) resource consumption and enabling advanced machine learning (ML) safety capabilities. In some implementations, the agent training and serving framework combines ensemble learning and evolutionary processes that repeatedly (e.g., continuously) select models with higher quality while removing models of poorer performance. Additionally, the DM-DSD system can automatically decompose the agent state space or vector space into subspace correlated subgroups that improve model performance. In addition to decomposition of the state space or vector space, the system supports the dynamic decomposition of the action-space of the model. Training and model serving can operate in distributed processes, but instead of storing their values in a single model, can build model ensembles as needed. Through the use of smaller easier to train models, and dynamic state and action space decomposition, the DM-DSD system can link sub-models with higher (e.g., the highest) relevance to a user's request, reducing computational resources from training to serving.

In some implementations, state and action spaces are decomposed across a plurality of models that track model quality based on an objective metric. As the model is trained, new models are created and older models can be removed based on their respective objective metric value that ensures the continual improvement of the models within the system over time in an automatic way.

In some implementations, a DM-DSD system can support one or more development and operations (Devops) and/or machine learning operations (MLOps) capabilities, such as built-in robustness against adversarial attacks, artificial intelligence (AI) safety features, which can include human in the loop processes, multi-model technology support for future proofing, gateable models, computational resource improvement (e.g., optimization), improved model testability, and/or the like. These features can improve model safety, trustworthiness, and energy efficiency while maintaining highly scalable models.

Some implementations are related to generating an ensemble of models that are relevant for a request. For instance, the request can be analyzed to determine attributes associated with the request, and the attributes can then be used to identify multiple different models that can be used as a model ensemble to process that request. The models in the model ensemble are a subset of models selected from a model storage. This model storage can also be updated over time to include models (e.g., newly trained models), delete models (e.g., whose performance is deemed undesirable), and/or modify models existing in the model space (e.g., whose performance is deemed undesirable). Therefore, by repeatedly updating the model storage, as well as selecting models from the model storage that are relevant for a given request, that given request can be processed to produce an output that is more accurate, at a faster speed, with improved computing efficiency, and/or the like.

FIG. 1 shows a block diagram of a DM-DSD compute device 100, according to an embodiment. The DM-DSD compute device 100 includes a processor 102 operatively coupled to a memory 104 (e.g., via a system bus). The DM-DSD compute device 100 can be any type of compute device, such as a server, a desktop, a laptop, a tablet, a mobile device, an internet-of-things device, and/or the like.

The processor 102 can be, for example, a hardware-based integrated circuit (IC) or any other suitable processing device configured to run and/or execute a set of instructions or code. For example, the processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 102 can be configured to run any of the methods and/or portions of methods discussed herein.

The memory 104 can be, for example, a random-access memory (RAM), a memory buffer, a hard drive, a read-only memory (ROM), an erasable programmable read-only memory (EPROM), and/or the like. The memory 104 can be configured to store any data used by the processor 102 to perform the techniques discussed herein. In some instances, the memory 104 can store, for example, one or more software programs and/or code that can include instructions to cause the processor 102 to perform one or more processes, functions, and/or the like. In some implementations, the memory 104 can include extendible storage units that can be added and used incrementally. In some implementations, the memory 104 can be a portable memory (for example, a flash drive, a portable hard disk, and/or the like) that can be operatively coupled to the processor 102. In some instances, the memory 104 can be remotely operatively coupled with a compute device (not shown in FIG. 1).

The memory 104 can include (e.g., store) a model storage 106. The model storage 106 can store multiple different models, such as multiple different machine learning (ML) models. Different models can be associated with (e.g., designed for) different tasks. The tasks can be any type of task that uses models, such as a computer vision task, a natural language processing task, a financial market analysis task, a cybersecurity task, and/or the like. The model storage 106 can include, for example, a supervised ML model, a semi-supervised ML model, an unsupervised ML model, a reinforcement ML model, and/or the like. In some implementations, the models included in model storage 106 can be configured to perform a smaller and/or narrower set of tasks. Said similarly, rather than being able to perform a larger number of tasks (e.g., 10, 100, 1000, etc.) with okay performance (e.g., at least 75% accuracy, within seconds), the models included in model storage 106 can perform a smaller number of tasks (e.g., 1, 2, 5, etc.) with exceptional performance (e.g., at least 95% accuracy, within milliseconds).

For example, one model in model storage 106 may be configured to determine if an image includes a cat, another model in model storage 106 may be configured to determine if an image includes a horse, and another model in model storage 106 may be configured to determine if an image includes a dog. As another example, one model in model storage 106 may be configured to collect telemetry data, another model in model storage 106 may be configured to predict risk against a cybersecurity attack using telemetry data, and another model in model storage 106 may be configured to determine remediation actions against a cybersecurity attack based on a risk. As another example, one model in model storage 106 may be configured to analyze text for spelling, another model in model storage 106 may be configured to analyze text for tense, and another model in model storage 106 may be configured to analyze text for punctuation. As such, in some implementations, the models in the model storage 106 may be specialized and/or narrowly tailored to perform specific functions.

In some implementations, each model from model storage 106 is associated with a set of state features. The set of state features for a given model can be used to determine if and/or how that model should be used for a request. For example, a model may be associated with state features indicating that the model is configured to recognize a particular object from an image, while another model may be associated with state features indicating that the model is configured to analyze text for punctuation. In some instances, the set of state features associated with each model from model storage 106 is provided by a user. In some instances, the set of state features associated with each model form model storage 106 is determined based on the training data used to train that model (e.g., set of state features are those features common among the training data).

In some implementations, each model from model storage 106 is associated with a set of vectors. For each model from model storage 106, the set of vectors can indicate attributes associated with that model. For example, the set of vectors for a given model may indicate that that model is configured to receive input in a predetermined format, that model is configured to perform a particular type of processing (e.g., image processing, language processing, etc.), a size of that model, a processing speed of that model, how many times or how long that model was previously used, an accuracy of that model, a resource consumption of that model, and/or the like. In some implementations, a vector database includes (e.g., all, a subset of) sets of vectors associated with models from model storage 106. For example, if a first model from model storage 106 is associated with a first set of vectors, a second model from model storage 106 is associated with a second set of vectors, and a third model from model storage 106 is associated with a third set of vectors, the vector database can include the first, second, and third set of vectors. The set of vectors for a given model can be used to determine if and/or how that model should be used for a request. For example, as is further discussed elsewhere herein, a set of vectors can be generated based on a request, and vectors from the vector database most similar to and/or closest in a vector subspace to the set of vectors generated based on the request can be identified. The models from model storage 106 associated with the identified vectors from the vector database can then be used to generate ML model ensemble 112. In some implementations, the vector database groups vectors based on similarity and those more similar are closer in distance in a vector subspace.

Model storage 106 can be repeatedly (e.g., continuously, periodically, sporadically, etc.) updated over time. This can include, for example, adding models to model storage 106, deleting models currently included in model storage 106, modifying models currently included in model storage 106, and/or the like.

In some implementations, a model can be added to model storage 106. The model can be trained at the DM-DSD compute device 100 and/or a different compute device not shown in FIG. 1 (e.g., a remote compute device). In some implementations, the model is validated (e.g., using an automated test) prior to the model being added to the model storage (if the validation fails, the model is not added to the model storage 106 and/or needs further investigation by a human or different test prior to being added to the model storage 106). Additional details related to training and adding a model to model storage 106 are discussed below with respect to FIG. 2.

In some implementations, a model is deleted from model storage 106. The process for determining that a model is to be deleted can be performed without human intervention, or with human intervention. In some implementations, a model can be checked via an automated test and without human intervention and, for example, if the check indicates that the model may need further investigating, human intervention can be requested. Otherwise, no human intervention is requested. In some implementations, a model is deleted if the model has not been used for a predetermined period of time (e.g., more than 1 day, more than 1 month, more than 1 year, and/or the like). In such a case, in some implementations, a usage of the model can be tracked using, for example, a feedback loop indicating if the model will be used and/or how long the model has not yet been used. In some implementations, a model is deleted if a threshold number of model ensembles (e.g., 5, 10, 15, 50, 100, etc.) have been generated that don't include the model. In such a case, in some implementations, a usage of the model can be tracked using, for example, a feedback loop indicating if the model will be used and/or how many model ensembles have been generated that did not used the model. In some implementations, a model is deleted if the model has not been included in a model ensemble for a predetermined most recent number of generated model ensembles (e.g., 5, 10, 15, 50, 100, etc.). In such a case, in some implementations, a usage of the model can be tracked using, for example, a feedback loop indicating if the model will be used and/or how many model ensembles have been generated that did not include the model. In some implementations, a model is deleted if the model fails the automated test (e.g., produces an output predetermined as improper, takes longer than a predetermined period of time to produce an output, accuracy is less than a predetermined threshold, a processing speed is less than a predetermined threshold, resource consumption is more than a predetermined threshold, and/or the like). In some implementations, a model is deleted if a human indicates that the model is to be deleted. In some implementations, a model is deleted if a similar (e.g., same or similar state features or vectors) and better performing (e.g., based on certain performance metrics) model has been added to the model storage. In some implementations, the model is deleted without retraining the model. In some implementations, a probability that a model from model storage 106 is under-performing is determined (e.g., based on how often the model is used, based on how efficient the model performs, and/or the like), and if the probability that the model is under-performing is greater than a predetermined threshold—the probability triggering threshold—model can be deleted. Examples of probability triggering thresholds can include a minimum efficiency, a minimum number of uses, a maximum size, and/or the like.

In some implementations, a model currently included in model storage 106 is updated. The model can be updated at the DM-DSD compute device 100 and/or at a compute device not shown in FIG. 1 (e.g., a remote compute device). In some implementations, a model can be updated if the model fails an automated test, such as, for example, the model produces an output predetermined as improper (e.g., suggesting something illegal and/or harmful), or takes longer than a predetermined period of time to produce an output (e.g., more than one second, more than one minute, more than 10 minutes, more than 30 minutes, etc.). In some implementations, models from model storage 106 can be updated using federated learning. For example, the DM-DSD compute device 100 can receive multiple different updates from multiple different compute devices (not shown in FIG. 1), without receiving the data used to generate and/or cause the update, and update one or more models based on the multiple different updates.

Over a period of time, model storage 106 can be updated multiple times. Therefore, the set of models included in model storage 106 at a first time can be different than the set of models included in model storage 106 at a second time different than the first time. Over time, the model storage 106 can be updated such that models that are more frequently used and/or of higher performance are kept, while models that are less frequently used and/or of lower performance are removed and/or replaced.

The memory 104 can also include (e.g., store) a representation of a request 108. In some implementations, the request 108 can be received based on input from a user (e.g., at DM-DSD compute device 100 and/or from a compute device via a network (e.g., using an application programming interface (API)) not shown in FIG. 1). An output for the request 108 can be produced, at least partially, using ML models. In some implementations, a user provides an indication of the request to a compute device not shown in FIG. 1, and the DM-DSD compute device 100 receives an electronic signal representing the request from the compute device not shown in FIG. 1 via a wired or wireless network (e.g., in substantially real time). The request 108 can be, for example, a request to analyze the input for at least one attribute (e.g., if a certain object is in an image, a predicted stock price from a set of financial data, a cybersecurity risk based on collected telemetry data, etc.), a request to transform an input (e.g., from one image to another, from one set of text to another, from one format to a different format, etc.), and/or the like. The request 108 can be any request where the output for that request can be produced using, at least partially, an ML model. The request 108 can be associated with, for example, text, an image, a video, telemetry data, sensor data, and/or the like.

In some implementations, the request 108 is associated with a set of attributes 110. In some implementations, the set of attributes 110 is represented as a set of state features. In some implementations, the set of attributes 110 is represented as a set of vectors. The request 108 can be associated with a state subspace or vector subspace, and the set of attributes 110 can be or represented as, for example, a subset of states or vectors from the state subspace or vector subspace that are most interesting, most valuable, having a non-zero vector value, and/or the like. For example, if the request 108 is to analyze an image, vectors of the image can be identified, and the non-zero vectors can be included in the set of attributes 110. In some implementations, the subset of states or vectors from the state subspace or vector subspace that are most interesting and/or most valuable are determined by a user. For example, a user can select and provide an indication of the subset of states or vectors most interesting and/or most valuable to the DM-DSD compute device 100. In some implementations, the subset of states from the state subspace or subset of vectors from the vector subspace that are most interesting and/or most valuable are determined through manual algorithms for an ML Model implementing dynamic spatial decomposition, randomly, or other heuristics that a user (e.g., data scientist) selects. In some implementations, the set of attributes 1110 associated with the request 108 are identified using meta-learning (e.g., metric-based meta-learning, model-based meta-learning, optimization-based meta-learning, etc.).

In some implementations, such as where set of attributes 110 is represented with a set of vectors and a size of request 108 is larger than a size/capacity/threshold associated with a vector from the set of vectors, request 108 can be chunked/divided up into multiple parts so that a size of each part is less than the vector's size/capacity/threshold. Each chunked/divided up part can then be associated with a vector from a plurality of vectors so that the plurality of vectors can be associated (e.g., chained, linked, concatenated, etc.) together and represent request 108. For example, if each vector from a set of vectors can hold up to 8,192 bytes and request 108 has a size of 24,576 bytes (i.e., three times 8,192), request 108 can be chunked into a first part that is 8,192 bytes and associated with a first vector from the set of vectors, a second part that is 8,192 bytes and associated with a second vector from the set of vectors, and a third part that is 8,192 bytes and associated with a third vector from the set of vectors; the first, second, and third parts/vectors can then be chained together to represent request 108. In some implementations, if a chunked/divided up part is smaller than a capacity of an associated vector from a plurality of vectors, the associated vector can be padded with null characters (e.g., zeros) at the end. For example, if a vector has a capacity of 8,192 bytes but a chunked part is 8,000 bytes, the vector can include the 8,000 bytes of the chunked part and padded at the end with 192 bytes of null characters.

In some implementations, request 108 may be associated with a plurality of attributes that includes set of attributes 110 and additional attributes not included in set of attributes 110. DM-DSD compute device 100 can be configured to generate set of attributes 110 from the plurality of attributes based on an importance associated with each attribute from the plurality of attributes. In some implementations, only the top X (where X can be any number) most important attributes from the plurality of attributes can be used to generate set of attributes 110. In some implementations, importance of attributes can be predetermined (e.g., based on input from a user, based on default settings, etc.). For example, if request 108 is associated with a document, macros can be considered more important than text in some implementations. For another example, if request 108 is an image, aspects of the image that show an object can be considered more important than those in the background in some implementations. For another example, if request 108 is speech, actual speech can be considered more important than noise.

In some implementations, set of attributes 110 can represent all attributes (e.g., all state features, all vectors) associated with request 108, and all attributes from set of attributes 110 can be used to select models from model storage 106. In some implementations, not all selected models are used in ML model ensemble 112. For example, set of attributes 110 may initially be used to identify five models from model storage 106, but ML model ensemble 112 may only include three of those five models. In some implementations, there is a predetermined number of models that can be used in ML model ensemble 112. In some implementations, where not all selected models are used in ML model ensemble 112, those models that are selected can be selected by, for example, being associated with a vector(s) determined as more important (e.g., models associated with the X most important vectors from the set of vectors); being associated with a number of vectors greater than a predetermined threshold (e.g., vector associated with the model is most similar/closest to a predetermined minimum number of vectors from the set of vectors that were generated based on request 108); if models are stored across multiple compute devices, based on an availability, processing power, network latency and/or the like associated with the compute devices storing the models (e.g., a model stored at a compute device that is not available, has less processing power, or poorer network latency may be less likely to be chosen compared to a model stored at a compute device that is available, has more processing power, or better network latency); and/or the like.

The set of attributes 110 can be used to search/filter through model storage 106 to assemble/generate ML model ensemble 112. ML model ensemble 112 can include a subset of ML models from model storage 106. The ML model ensemble 112 can include at least two different ML models. The ensemble learning method of the ML model ensemble 112 can be any type, such as bagging ensemble learning, stacking ensemble learning, boosting ensemble learning, and/or the like. If set of attributes 110 is represented using a set of state features, because each model from the model storage 106 is associated with state features, the set of state features 110 can be used to identify models from the model storage 106 with similar state features. For example, if the set of state features 110 includes features A, B, and C, the model storage 106 can be searched to find models associated with state features A, B, and C to generate ML model ensemble 112. As another example, if the set of states features 110 includes features associated with a dog and a cat, the model storage 106 can be searched to find models associated with a dog and a cat. If set of attributes 110 is represented using a set of vectors, the vector database can be used to identify vectors from the vector database similar to and/or within a predetermined distance of the set of vectors; models from model storage 106 can then be identified using the identified vectors from the vector database to generate ML model ensemble 112.

In some implementations, where the set of attributes 110 includes N attributes (e.g., N state features, N vectors), for each attribute from the set of attributes 110, each model from the model storage 106 associated with that attribute is flagged/marked. Upon flagging/marking for each attribute from the set of attributes 110, the models with the most flags/marks can be used to generate the ML model ensemble 112 (e.g., the top N models with the most flags/marks, the top N−1 models with the most flags/marks, the top N−2 models with the most flags/marks, the top N+1 models with the most flags/marks, the top N+2 models with the most flags/marks, etc.).

The ML model ensemble 112 can be used to process request 108 to generate an output. In some implementations, the output can be output (e.g., visually and/or audibly) at DM-DSD compute device 100 and/or at a compute device not shown in FIG. 1 (e.g., operatively coupled to DM-DSD compute device 100 via a network). In some implementations, at least one model from model storage 106 is updated via reinforcement learning and based on the output. For example, the at least one model can be retrained using the output.

Over time, other requests (different than request 108) can be received and processed by DM-DSD compute device 100. For each request, the DM-DSD compute device 100 can generate an ML model ensemble that is most suitable/relevant for that request.

Although FIG. 1 shows model storage 106 at DM-DSD compute device 100, in some implementations, model storage 106 can be distributed across multiple compute device communicatively coupled to each other and/or DM-DSD compute device 100 (e.g., via a network). Said differently, rather than a single compute device storing all models, the models can be distributed across multiple compute devices. In such cases, in some implementations, identifying models from the model storage to use for generating ML model ensemble 112 can be based on an availability associated with each compute device from the multiple compute devices (e.g., can be preferrable to select models stored at compute devices that are available rather than unavailable), a processing power associated with each compute device from the multiple compute devices (e.g., can be preferrable to select models stored at compute devices that have more processing power rather than less processing power), a network latency associated with the network (e.g., can be preferrable to select models stored at compute devices that are less affected and/or likely to be affected by network latency), and/or the like.

In some implementations, model storage 106 is stored at a compute device different than DM-DSD compute device 100. This can be the case if, for example, one party wants to keep model storage 106 separate from a different party. In such a case, DM-DSD compute device 100 can have access to metadata associated with model storage 106. DM-DSD compute device 100 can filter through model storage 106 (e.g., to generate ML model ensemble 112) based on the metadata, and access the models in model storage 106 via an application programming interface (API).

In some implementations, some models of model storage 106 are stored at memory 104 of DM-DSD compute device 100, and some models are stored at a compute device different than DM-DSD compute device 100. This can be the case if, for example, one party wants to keep some models separate from a different party (e.g., some models are internal models and other models are public models). In such a case, DM-DSD compute device 100 can have access to metadata associated with the models that are stored at the compute device different from DM-DSD compute device 100. DM-DSD compute device 100 can filter (1) models that are stored at the compute device different from DM-DSD compute device 100 using the metadata and (2) models from model storage 106 stored at memory 104 to generate ML model ensemble 112. In some implementations, models stored at the compute device different from DM-DSD compute device 100 are accessed via an API.

Figure 2:
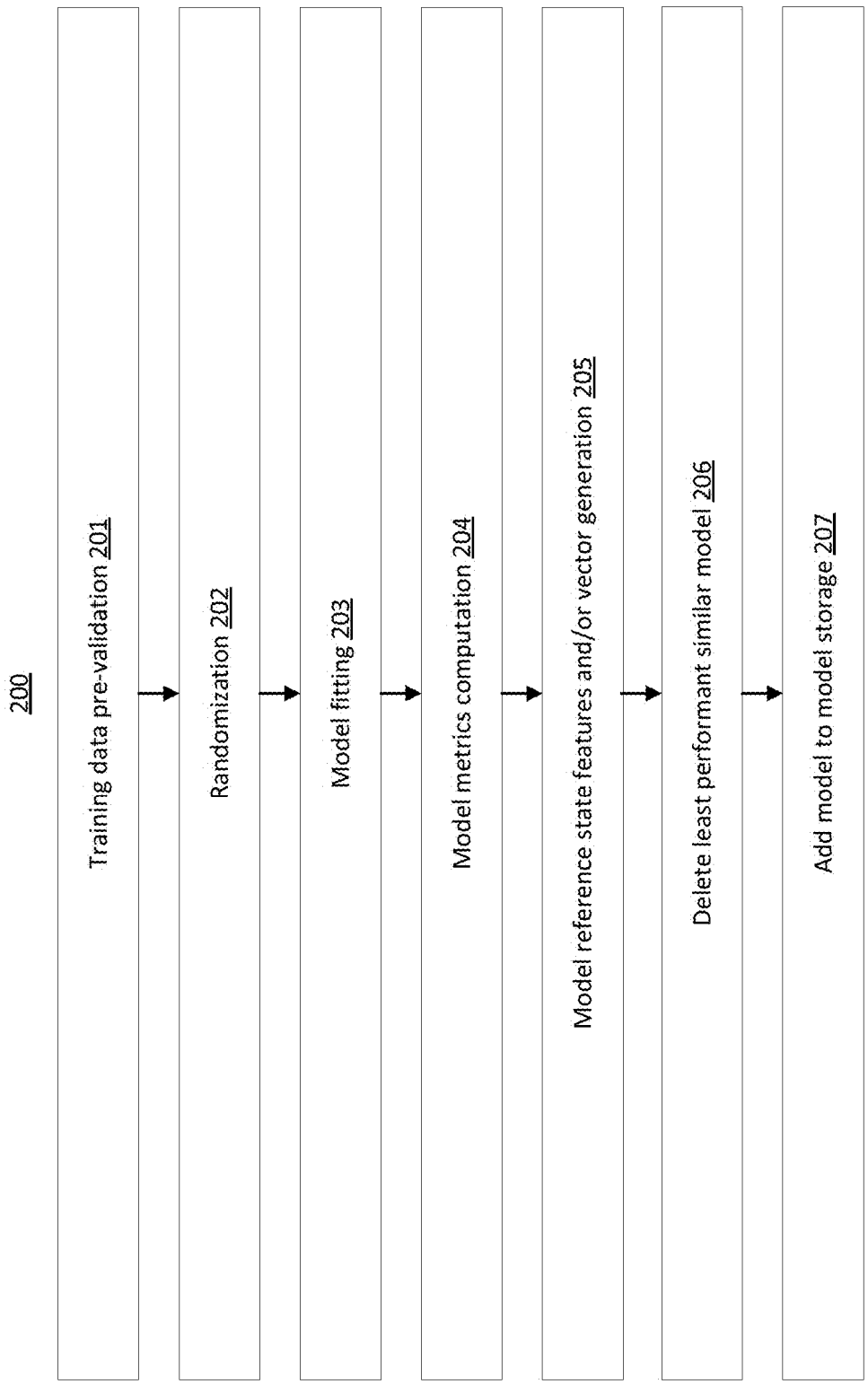
FIG. 2 shows a flowchart of a method to add an ML model to a model storage, according to an embodiment.

FIG. 2 shows a flowchart of a method 200 to add an ML model to a model storage (e.g., model storage 106), according to an embodiment. In some implementations, method 200 can be performed by a processor (e.g., processor 102 and/or a processor of a compute device not shown in FIG. 1).

At 201, training data is pre-validated. The training data can be associated with a task for which an ML model is to be trained. For example, the training data can include input learning data and output learning data. Pre-validating the training data can include, for example, deleting training data that is redundant, or modifying training data so that the training data has a predetermined standard format (e.g., common background, common font, common size, etc.).

At 202, the training data is randomized. Randomizing may help, for example, to reduce bias, improve prediction performance, balance data to improve discriminatory quality, and/or the like.

At 203, the ML model is fitted using the randomized, pre-validated training data. Fitting can include, for example, modifying weights of the ML model.

At 204, metrics for the ML model are computed. The metrics can include indications of performance of the ML model, such as, for example, a speed, accuracy, size, processing power, and/or the like.

At 205, state features and/or vectors for the ML model are generated. The state features and/or vectors can indicate attributes associated with (e.g., describing) the ML model, such as, for example, the ML model's functionality, type, size, purpose, and/or the like. Indication of the state features and/or vectors can be received from a human and/or predicted based on the training data (and if the latter, optionally confirmed by a human).

At 206, a least performant similar model is deleted from a model storage (e.g., from model storage 106). In some implementations, similar models can refer to other models in model storage that have similar state features and/or vectors as those generated at 205 (e.g., at least 25% similar, at least 50% similar, at least 75% similar, etc.). Of the similar models, the least performant model may be the similar model with, for example, the lowest speed, lowest accuracy, largest size, and/or the like. In some implementations, deletion of under-performing models can be performed based on a probability triggering threshold (e.g., that is predetermined) where if true the model is deleted. In some implementations, a probability that a model is under-performing is determined, and if the probability is greater than a predetermined threshold (e.g., the probability triggering threshold), the model can be deleted.

At 207, the ML model is added to the model storage. In some implementations, the ML model is indicated to be pending validation (e.g., by an automated test and/or a human reviewer). After the ML model has been validated, the ML model may be used (e.g., included in an ML ensemble) or deleted.

Figure 3:
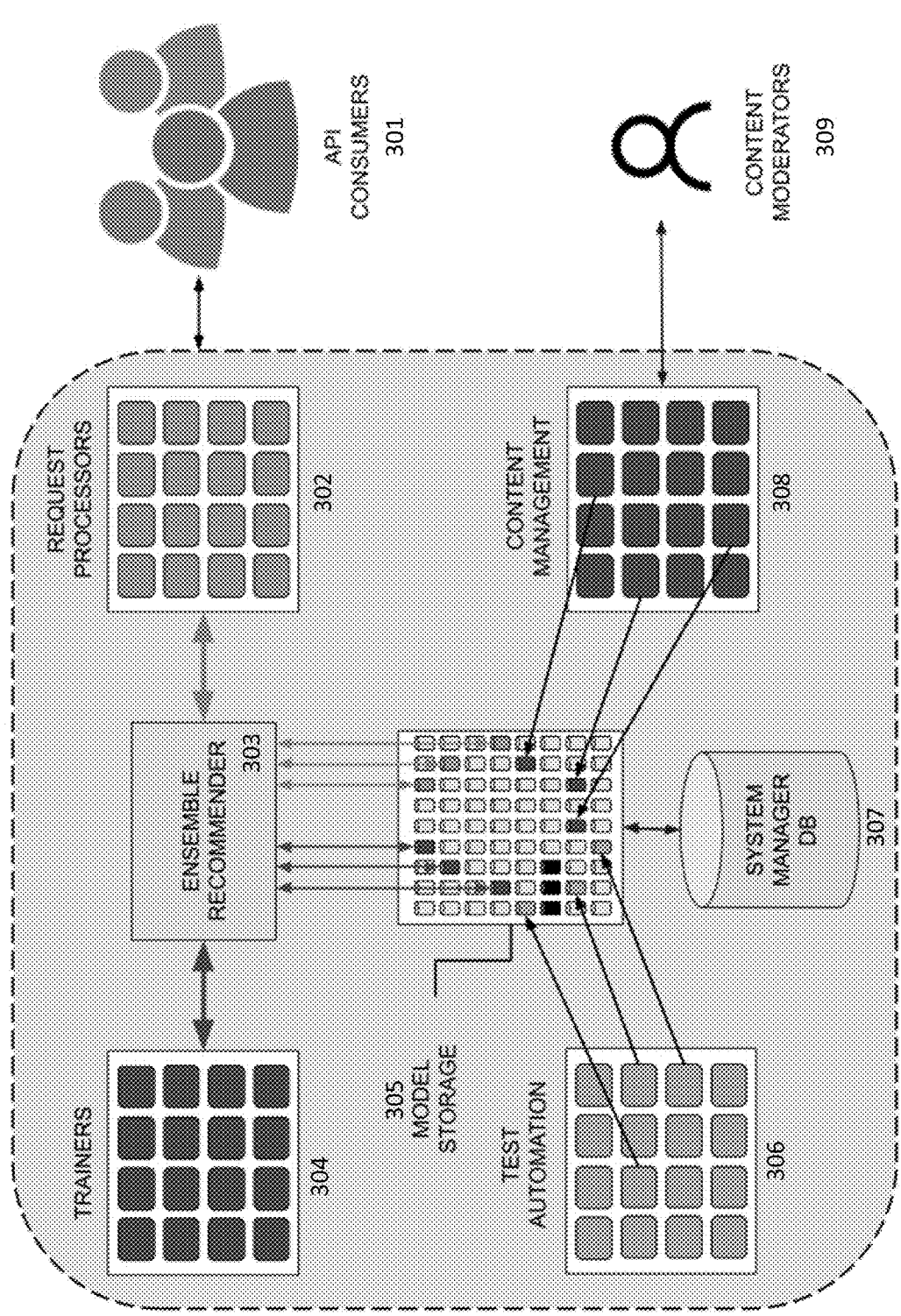
FIG. 3 shows an illustration of a DM-DSD system, according to an embodiment.

FIG. 3 shows an illustration of a DM-DSD system, according to an embodiment. FIG. 3 includes representations of API consumers 301, request processors 302, ensemble recommender 303, trainers 304, model storage 305, test automation 306, system manager database 307, content management 308, and content moderators 309. The request processors 302, ensemble recommender 303, trainers 304, model storage 305, test automation 306, system manage database 307, and content management 308 can be included within a single compute device (e.g., DM-DSD computer device 100), or a plurality of compute devices (e.g., remote compute device via a network). In some implementations, the request processors 302, ensemble recommender 303, trainers 304, model storage 305, test automation 306, system manage database 307, and/or content management 308 are represented by software code that can be executed.

Trainers 304 can train models. The models can, for example, include any type of ML technology in the supervised, semi-supervised, unsupervised and/or reinforcement learning domains. In some implementations, a compute device(s) associated with API consumers 301 and/or a compute device not shown in FIG. 3 can initiate multiple training processes simultaneously to achieve horizontal scalability. Each trainer can be specific to a particular ML algorithm and/or model (e.g., Q-Learning, advantage actor-critic (A2C), asynchronous advantage actor-critic (A3C), convolutional neural network (CNN), Text Classification, etc.). An example of a training process that can be performed at trainers 304 is discussed with respect to method 200. In some implementations, trainers 304 use ensemble recommender 303 to identify similar models near the training context. These similar models can be used to improve the value over time of different parts of a domain. Trainers 304 can train, for example, an RL model using state, reward, action, and next state information, an image classifier using image and label information, and/or the like. In some implementations, trainers 304 are included in and/or executed by a compute device that is remote from ensemble recommender 303. In some implementations, trainers 304 are included in and/or executed by a compute device that also includes ensemble recommender 303.

Request processors 302 can manage the receiving of a request from a user, and the serving of model responses to the user, such as application programming interface (API) consumers 301 (e.g., via a compute device of API consumers 301). In response to a request (e.g., request 108), request processors 302 can use ensemble recommender 303 system to select N models (where N can be two or more) that are closest to the state space or vector space of the request, creating a state space or vector space relevant ensemble. In some implementations, the ensemble votes or computes value averages of model predictions, which are used in the client response. In some implementations, request processors 302 hydrates (e.g., loads a subset of models from model storage 305) a portion of the overall state or vector space on a per request perspective, reducing power consumption over time. In some implementations, request processors 302 are included in a compute device that is remote from ensemble recommender 303. In some implementations, request processors 302 are included in a compute device that also includes ensemble recommender 303. Although request processors 302 indicates multiple processors, in other implementations, a single processor can be used.

Ensemble recommender 303 is responsible for identifying models near the requested queried state or vector. This search process can use state feature or vector collections that are a sparse representation of, for example, the highest value state or vector, or strongest predictor state features or vectors. Models in the model storage 305 can be associated with one or more reference features and/or vectors. This supports creating reference systems for different state or vector space distributions within each ML task. An example of this can be seen in reinforcement learning, where a solution can use a single reference vector for a state or vector space patch, compared to an image classification problem where each model can contain a set of classes that thus use a collection of state or vector space references to allow the ensemble recommendation system to find the appropriate models. In some implementations, the ensemble recommender 303 does not use a deep learning (DL) model. The use of a collaborative filtering recommender for ensemble recommender 303 instead of training a DL model is that the models within model storage 305 can constantly, periodically and/or sporadically be changing as the DM-DSD system learns more about a problem and adjusts the distribution of models across the different sub-spaces in an automatic way. Because of this dynamic process, a DL approach may not be considered a valid choice since the DL approach may not be able to update on the desired timeframe. In some implementations, a DL model is used at ensemble recommender 303.

Models in the system can undergo validation at test automation 306 if, for example, the model is about to be added to model storage 305, the model has recently been added to the model storage 305, an issue has been reported in regards to the response of the model to a client request, and/or the like. Similar to DevOps principles, test automation 306 can provide an automation process based on known constraints, such as, for example, outputs that are acceptable, outputs that are not acceptable, processing speed, processing efficiency, and/or the like. In some implementations, these automated tests perform a low-level and/or first-pass check to ensure that the models meet functional and safety criteria. This can ensure model integrity and trustworthiness of models in the model storage 305. In some implementations, test automation 306 is stored at the same compute device as model storage 305.

Content management 308 can investigate and/or correct issues identified before, while, and/or after a model is in operation. Because the model can be an ensemble of smaller models, content management 308 can review reported issues with DM-DSD system predictions from a safety and/or integrity perspective, which can use only automated evaluation, only human evaluation, or a combination of both. In some implementations, the review process can be as follows. First, an undesirable and/or harmful response produced by a model ensemble for a request is reported (e.g., by a user or compute device). Second, models of the model ensemble used in the flagged response are marked under review and not used for other requests until resolved. Third, automation tests are executed against reported models. If an issue is identified, the flagged models can be removed from the model storage 305. If the automated tests are unable to identify an issue, the system can forward the issue to a human reviewer (e.g., content moderator 309). Fourth, a human reviews the request and response to determine if the response is considered undesirable and/or harmful. If determined to be undesirable and/or harmful, the models reporting the undesirable and/or harmful response are modified and/or removed from the model storage 305. If not determined to be undesirable and/or harmful, the models' status is updated (e.g., to active) and usable for other requests.

System manager database 307 can manage the metadata for models within the model storage 305. This can include, for example, metadata representing user accounts, models, state features, vectors, state feature mappings, training data, and/or the like. In some implementations, the ensemble recommender 303 uses data from the system manger database 307 to generate an ML model ensemble. Rather than analyzing each model in model storage 305, the metadata for each model in model storage 305 is analyzed (at least initially) during the process of generating the ML model ensemble (which can decrease the amount of time needed to generate the ML model ensemble).

Model storage 305 can store models. In some implementations, model storage 305 can use cloud-based blob storage services to persist model products. In some implementations, models can be loaded into model storage 305 by processing services that include training (e.g., by trainers 304), predicting (e.g., by request processor), validating (e.g., by test automation 306), and content management (e.g., by content management 308). The model storage 305 can support the use of mixed technologies, which can increase the flexibility of the DM-DSD system.

In some implementations, a representation of a request is received at request processors 302 from API consumers 301. For example, API consumers 301 may use a compute device(s) to indicate the request, and the representation of the request can be sent from the compute device(s) to request processor 302 (e.g., via an API over a network). The request can be processed at request processors 302, and ensemble recommender 303 may identify and generate a model ensemble using models from model storage 305 that can be used to process the request and generate an output. The output can be analyzed at test automation 306 automatically and without requiring any human intervention. If the test automation 306 determines that further analysis is needed, content management 308 can be used to get content moderators 309 to review the output and/or models of the model ensemble. If test automation 306 and/or content moderators 309 determine that the output is acceptable, a representation of the output can be sent to the compute device(s) of API consumers 301. Additionally, trainers 304 can be used to include new models to model storage 305, and test automation 306 and/or content management 308 can be used to remove models from model storage 305.

Figure 4:
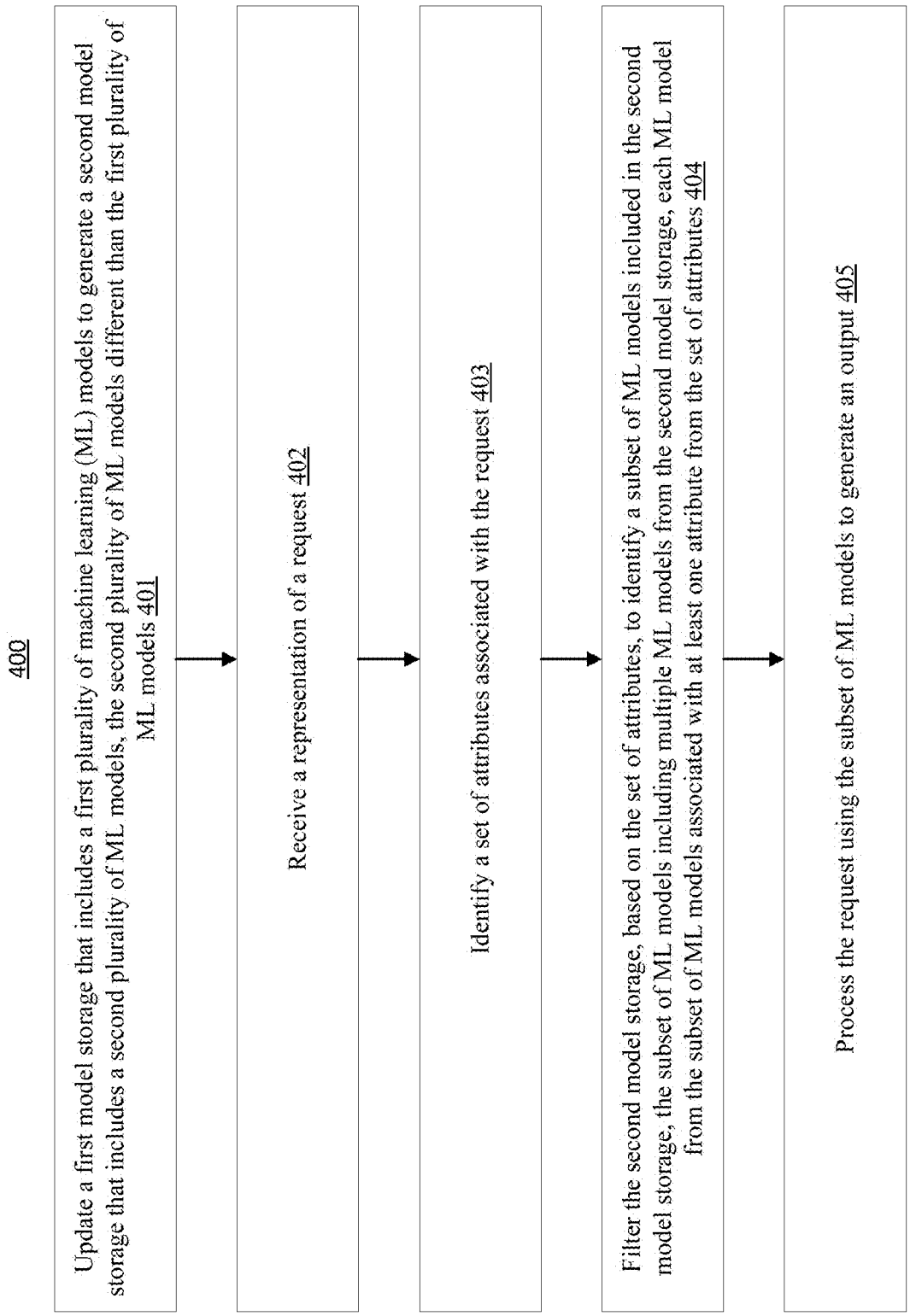
FIG. 4 shows a flowchart of a method to process a request using an ML model ensemble, according to an embodiment.

FIG. 4 shows a flowchart of a method 400 to process a request using an ML model ensemble, according to an embodiment. In some implementations, method 400 is performed by a processor (e.g., processor 102 of FIG. 1).

At 401, a first model storage (e.g., model storage 106) that includes and/or stores a first plurality of machine learning (ML) models is updated to generate a second model storage (e.g., updated version of model storage 106) that includes a second plurality of ML models. The second plurality of ML models is different than the first plurality of ML models. The second plurality of ML models may have more ML models than the first plurality of ML models, the same number of ML models as the first plurality of ML models, or less ML models than the first plurality of ML models.

At 402, a representation of a request (e.g., request 108) is received. The request can be based on input from a user (e.g., API consumers 301). In some implementations, the request can be received from a remote compute device via a network (e.g., via an API from a remote compute device).

At 403, a set of attributes (e.g., set of attributes 110) associated with the request is identified. In some implementations, identifying the set of attributes includes identifying attributes of the request that are most interesting, most valuable, have non-zero vector values, and/or the like. Selection of these attributes can be by hand-coded heuristics, computational analysis, random selection, and/or the like.

At 404, the second model storage is searched and/or filtered, based on the set of attributes, to identify a subset of ML models (e.g., ML model ensemble 112) that includes a subset of ML models included in the second model storage. The subset of ML models includes multiple ML models from the second model storage. Each ML model from the subset of ML models is associated with at least one attribute from the set of attributes. In some implementations, searching and/or filtering through the second model storage to identify the subset of ML models is performed without using a deep learning model.

At 405, the request is processed using the subset of ML models, thereby causing the output to be generated. For example, a representation of the request is input into the subset of ML models to generate the output.

In some implementations of method 400, updating the first model storage to generate the second model storage at 401 includes causing the second plurality of ML models to include an ML model that is not included in the first plurality of ML models. The ML model ensemble identified at 404 can include the ML model, but does not have to. In some implementations, the set of attributes is represented using a set of state features and the ML model is trained using a process that includes: receiving training data; validating the training data; randomizing, after validating the training data, the training data to generate randomized training data; training the ML model using the randomized training data; determining a set of performance metrics associated with the ML model; and generating (1) state features associated with the ML model and (2) action features associated with the ML model. The ML model can be included in the second plurality of ML models after generating the state features and/or the action features. Some implementations further include: identifying, using the set of performance metrics associated with the ML model and a probability triggering threshold, at least one ML model from the second model storage that is to be deleted; and deleting the at least one ML model from the second model storage (e.g., if the probability triggering threshold has been exceeded) to generate a third model storage (e.g., the same as the second model storage but with the at least one ML model removed).

Some implementations of method 400 further include: identifying at least one ML model from the second model storage that is to be deleted; and deleting the at least one ML model from the second model storage to generate a third model storage. In some implementations, at least one ML model that is to be deleted is identified based on at least one of an accuracy associated with the at least one ML model, a processing speed associated with the at least one ML model, or a resource consumption associated with the at least one ML model.

In some implementations of method 400, the request is a first request, the set of attributes is a first set of attributes, the subset of ML models is a first subset of ML models, the output is a first output, and the method further includes: updating the second model storage to generate a third model storage that includes a third plurality of ML models different than the second plurality of ML models; receiving a representation of a second request; identifying a second set of attributes associated with the second request, the second set of attributes different than the first set of attributes; searching and/or filtering the third model storage using the second set of attributes to identify a second subset of ML models included in the third model storage, the second subset of ML models includes multiple ML models from the third model storage, each ML model from the second subset of ML models associated with at least one attribute included in the second set of attributes, the second subset of ML models different than the first subset of ML models; and causing, to generate a second output, the second request to be processed using the second subset of ML models.

Some implementations of method 400 further include: receiving an indication that the output is potentially harmful; preventing the subset of ML models from being used against future requests; performing, without user intervention, a set of tests on the subset of ML models to determine that at least one issue is present; requesting user review of the output and the request in response to determining that the at least one issue is present; and one of (a) deleting the subset of ML models or (b) enabling the subset of ML models to be used against future requests.

In some implementations of method 400, the set of attributes is represented using at least one of a set of state features or a set of vectors, a representation of the set of attributes and a representation of the request are included in at least one of a state subspace or a vector subspace, and the representation of the set of attributes are closest to (e.g., least distance) the representation of the request in the at least one of the state subspace or the vector subspace.

In some implementations of method 400, the set of attributes associated with the request are identified using meta-learning.

Some implementations of method 400 further include: updating, via reinforcement learning, at least one ML model from the subset of ML models based on the output.

In some implementations of method 400, the second model storage is distributed across a set of compute devices that are communicatively coupled via a network, and the filtering the second model storage to identify the subset of ML models is further based on at least one of an availability associated with each compute device from the set of compute devices, a processing power associated with each compute device from the set of compute devices, or a network latency associated with the network.

In some implementations of method 400, the first plurality of ML models is associated with a first amount of usage determined based on a first feedback loop associated with the first plurality of ML models and the second plurality of ML models is associated with a second amount of usage (1) determined based on a second feedback loop associated with the second plurality of ML models and (2) that is more than the first amount of usage.

In some implementations of method 400, the set of attributes is represented as a set of vectors, each ML model from the second model storage is associated with at least one vector from a plurality of vectors, and the subset of ML models are identified based on identifying a subset of vectors from the plurality of vectors that are similar to the set of vectors.

Figure 5:
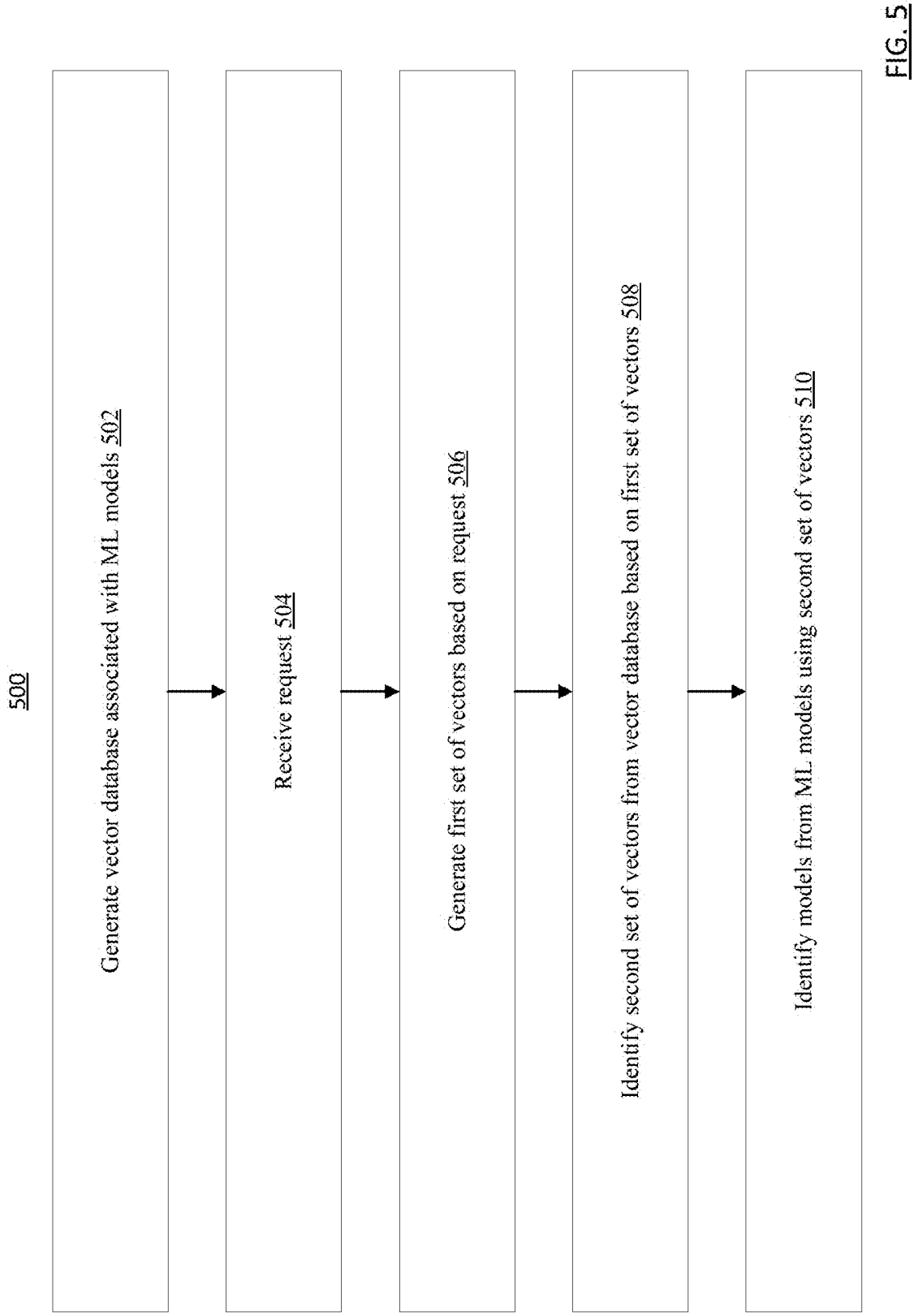
FIG. 5 shows a flowchart of a method to identify models from a model storage based on vectors generated from a request, according to an embodiment.

FIG. 5 shows a flowchart of a method 500 to identify models from a model storage based on vectors generated from a request, according to an embodiment. In some implementations, method 500 is performed by a processor (e.g., processor 102 of FIG. 1).

At 502, a vector database associated with ML models (e.g., model storage 106) is generated. Each model from the ML models can be associated with one or more vectors that are included in the vector database. At 504, a request (e.g., request 108) is received. At 506, a first set of vectors (e.g., set of attributes 110) is generated based on the request. At 508, a second set of vectors is identified from the vector database based on the first set of vectors. For example, the second set of vectors can include vectors from the vector database most similar and/or within a predetermined distance in a vector subspace to the first set of vectors. At 510, models (e.g., ML model ensemble 112) from the ML models are identified using the second set of vectors. For example, for each vector from the second set of vectors, the model from ML models associated with/linked to that vector can be identified.

Figure 6:
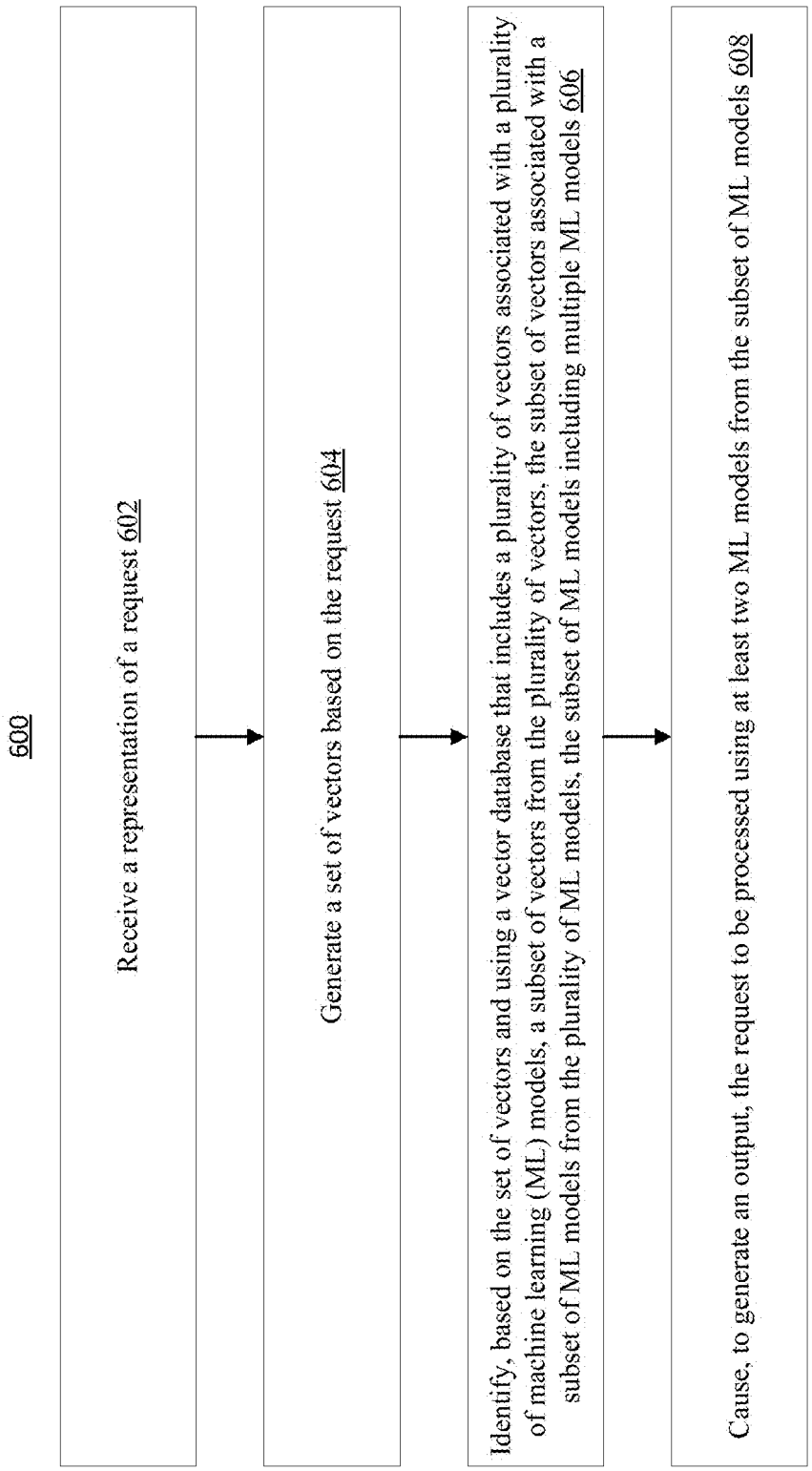
FIG. 6 shows a flowchart of a method to identify models using vectors and use those identified models to generate an output, according to an embodiment.

FIG. 6 shows a flowchart of a method 600 to identify models using vectors and use those identified models to generate an output, according to an embodiment. In some implementations, method 600 is performed by a processor (e.g., processor 102 of FIG. 1).

At 602, a representation of a request (e.g., request 108) is received. At 604, a set of vectors (e.g., set of attributes 110) are generated based on the request. At 606, based on the set of vectors and a vector database that includes a plurality of vectors associated with a plurality of machine learning (ML) models, a subset of vectors from the plurality of vectors is identified. The subset of vectors is associated with a subset of ML models from the plurality of ML models. The subset of ML models includes multiple ML models. At 608, the request is caused to be processed using at least two ML models (e.g., ML model ensemble 112) from the subset of ML models to generate an output. The subset of ML models can include only the at least two ML models in some implementations. The subset of ML models can include the at least two ML models and other models in some implementations.

Some implementations of method 600 further include determining that a size associated with the request is larger than a predetermined threshold. The request can be divided into a plurality of parts. Each part from the plurality of parts is not larger than the predetermined threshold and associated with at least one vector from the set of vectors. The set of vectors can be generated using the plurality of parts and a capacity of each vector from the set of vectors is less than the predetermined threshold.

Some implementations of method 600 further include identifying, for each vector from the set of vectors, a vector from the plurality of vectors most similar to that vector. The vector most similar to that vector can be associated with at least one ML model that is from the plurality of ML models and included in the subset of ML models.

In some implementations of method 600, the set of vectors is a first set of vectors and method 500 further includes generating a second set of vectors based on the request before generating the first set of vector. Method 600 can further include identifying, based on an importance associated with each vector from the second set of vectors, the first set of vectors as a subset of vectors from the second set of vectors.

In some implementations of method 600, a number of ML models included in the at least two ML models is less than a number of ML models included in the subset of ML models. Some implementations further include identifying the at least two ML models from the subset of ML models based on the set of vectors. For example, the at least two ML models can include the models associated with the largest number of vectors, the models associated with the most important vectors, and/or the like.

Figure 7:
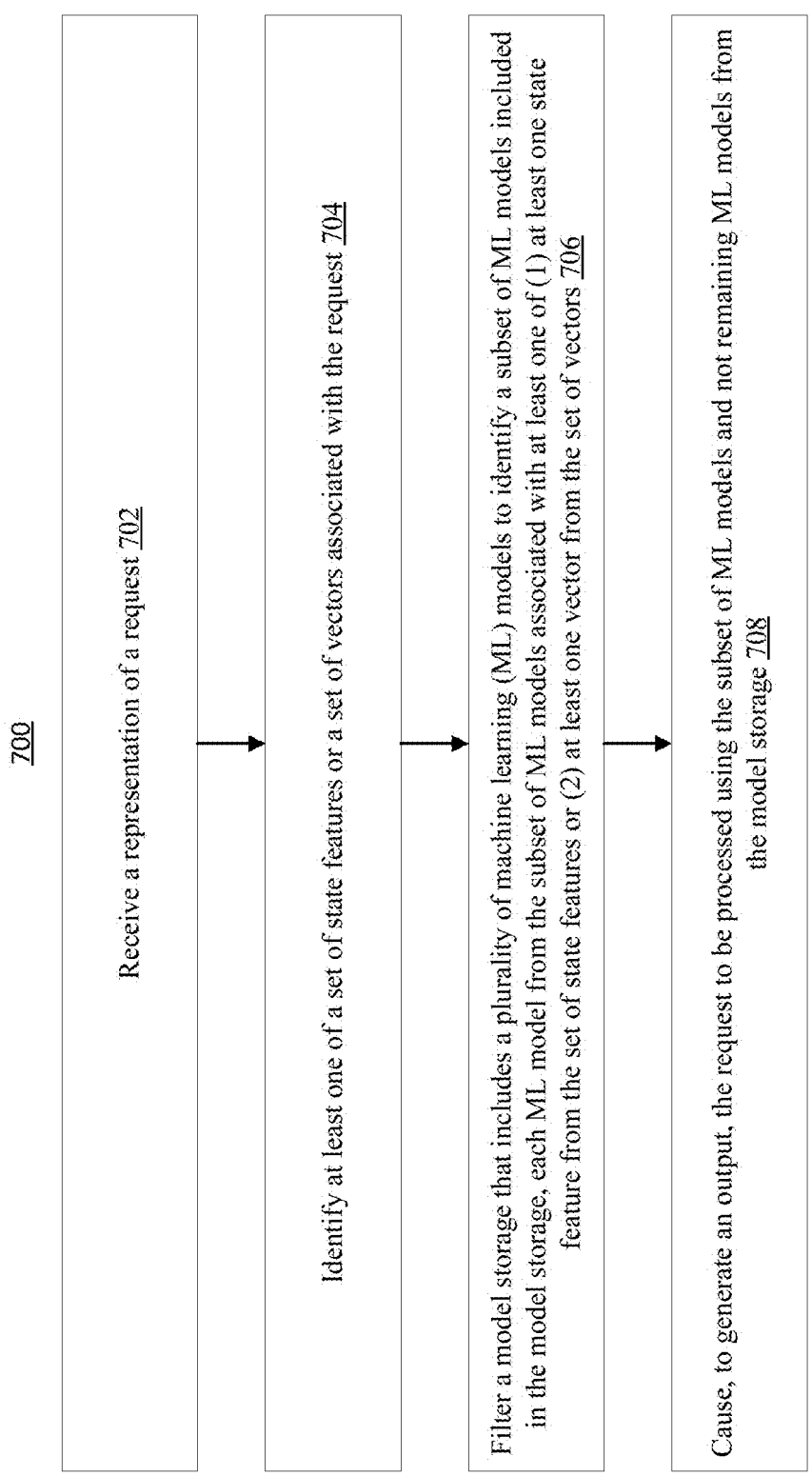
FIG. 7 shows a flowchart of a method to identify models using state features or vectors and use those identified models to generate an output, according to an embodiment.

FIG. 7 shows a flowchart of a method 700 to identify models using state features or vectors and use those identified models to generate an output, according to an embodiment. In some implementations, method 700 is performed by a processor (e.g., processor 102 of FIG. 1).

At 702, a representation of a request (e.g., request 108) is received. At 704, at least one of a set of state features or a set of vectors (e.g., set of attributes 110) associated with the request is identified. At 706, a model storage (e.g., model storage 106) that includes a plurality of ML models is filtered to identify a subset of ML models (e.g., ML model ensemble 112) included in the model storage. Each ML model from the subset of ML models is associated with at least one of (1) at least one state feature from the set of state features or (2) at least one vector from the set of vectors. At 708, the request is caused to be processed using the subset of ML models and not remaining ML models from the model storage to generate the output.

In some implementations of method 700, the model storage includes a set of ML models stored at a remote compute device. Filtering the model storage at 706 can include filtering the set of ML models based on metadata associated with the set of ML models. The set of ML models can be accessible via an application programming interface (API).

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

In some implementations, a network can be any suitable communications network for transferring data, operating over public and/or private networks. For example, a network can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, a network can be a wireless network such as, for example, a Wi-Fi or wireless local area network ("WLAN"), a wireless wide area network ("WWAN"), and/or a cellular network. In other instances, a network can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via the network can be encrypted or unencrypted. In some instances, the network can include multiple networks or subnetworks operatively coupled to one another by, for example, network bridges, routers, switches, gateways and/or the like.

While specific embodiments of the present disclosure have been outlined above, many alternatives, modifications, and variations will be apparent to those skilled in the art. Accordingly, the embodiments set forth herein are intended to be illustrative, not limiting.

What is claimed is:

1. A method, comprising:
    receiving a representation of a request;
    identifying a set of attributes associated with the request;
    updating a first model storage that includes a first plurality of machine learning (ML) models to generate a second model storage that includes a second plurality of ML models, the second plurality of ML models including an ML model that is not included in the first plurality of ML models, the set of attributes represented using a set of state features and the ML model trained using a process that includes:
        receiving training data;
        validating the training data;
        randomizing, after validating the training data, the training data to generate randomized training data; and
        training the ML model using the randomized training data;
    filtering the second model storage, based on the set of attributes, to identify a subset of ML models included in the second model storage, the subset of ML models including multiple ML models from the second model storage, each ML model from the subset of ML models associated with at least one attribute from the set of attributes; and
    causing, to generate an output, the request to be processed using the subset of ML models.

2. The method of claim 1, wherein the filtering the second model storage to identify the subset of ML models is performed without using a deep learning model.

3. The method of claim 1, further comprising:
    identifying at least one ML model from the second model storage that is to be deleted; and
    deleting the at least one ML model from the second model storage to generate a third model storage.

4. The method of claim 3, wherein the at least one ML model that is to be deleted is identified based on at least one of an accuracy associated with the at least one ML model, a processing speed associated with the at least one ML model, or a resource consumption associated with the at least one ML model.

5. The method of claim 1, wherein the request is a first request, the set of attributes is a first set of attributes, the subset of ML models is a first subset of ML models, the output is a first output, and the method further comprises:
updating the second model storage to generate a third model storage that includes a third plurality of ML models different than the second plurality of ML models;
receiving a representation of a second request;
identifying a second set of attributes associated with the second request, the second set of attributes different than the first set of attributes;
filtering the third model storage using the second set of attributes to identify a second subset of ML models included in the third model storage, the second subset of ML models including multiple ML models from the third model storage, each ML model from the second subset of ML models associated with at least one attribute included in the second set of attributes, the second subset of ML models different than the first subset of ML models; and
causing, to generate a second output, the second request to be processed using the second subset of ML models.

6. The method of claim 1, further comprising:
receiving an indication that the output is potentially harmful;
preventing the subset of ML models from being used against future requests;
performing, without user intervention, a set of tests on the subset of ML models to determine that at least one issue is present;
requesting user review of the output and the request in response to determining that the at least one issue is present; and
one of (a) deleting the subset of ML models or (b) enabling the subset of ML models to be used against future requests.

7. The method of claim 1, wherein the set of attributes is represented using at least one of a set of state features or a set of vectors, a representation of the set of attributes and a representation of the request are included in at least one of a state subspace or a vector subspace, and the representation of the set of attributes are closest to the representation of the request in the at least one of the state subspace or the vector subspace.

8. The method of claim 1, wherein the set of attributes associated with the request are identified using meta-learning.

9. The method of claim 1, further comprising:
updating, via reinforcement learning, at least one ML model from the subset of ML models based on the output.

10. The method of claim 1, wherein the second model storage is distributed across a set of compute devices that are communicatively coupled via a network, and the filtering the second model storage to identify the subset of ML models is further based on at least one of an availability associated with each compute device from the set of compute devices, a processing power associated with each compute device from the set of compute devices, or a network latency associated with the network.

11. The method of claim 1, wherein the first plurality of ML models is associated with a first amount of usage determined based on a first feedback loop associated with the first plurality of ML models and the second plurality of ML models is associated with a second amount of usage (1) determined based on a second feedback loop associated with the second plurality of ML models and (2) that is more than the first amount of usage.

12. The method of claim 1, wherein the set of attributes is represented as a set of vectors, each ML model from the second model storage is associated with at least one vector from a plurality of vectors, and the subset of ML models are identified based on identifying a subset of vectors from the plurality of vectors that are similar to the set of vectors.

13. The method of claim 1, wherein the subset of ML models includes the ML model.

14. The method of claim 1, wherein the subset of ML models does not include the ML model.

15. The method of claim 1, wherein the process further includes:
determining a set of performance metrics associated with the ML model; and
generating (1) state features associated with the ML model and (2) action features associated with the ML model, the ML model included in the second plurality of ML models after at least one of generating the state features or the action features.

16. The method of claim 15, further comprising:
identifying, using the set of performance metrics associated with the ML model and a probability triggering threshold, at least one ML model from the second model storage that is to be deleted; and
deleting the at least one ML model from the second model storage to generate a third model storage.

17. A non-transitory processor-readable medium storing code representing instructions to be executed by a processor, the instructions comprising code to cause the processor to:
receive a representation of a request;
determine that a size associated with the request is larger than a predetermined threshold;
divide the request into a plurality of parts, each part from the plurality of parts not larger than the predetermined threshold,
generate a set of vectors based on the request and using the plurality of parts, a capacity of each vector from the set of vectors being less than the predetermined threshold, each part from the plurality of parts associated with at least one vector from the set of vectors;
identify, based on the set of vectors and using a vector database that includes a plurality of vectors associated with a plurality of machine learning (ML) models, a subset of vectors from the plurality of vectors, the subset of vectors associated with a subset of ML models from the plurality of ML models, the subset of ML models including multiple ML models; and
cause, to generate an output, the request to be processed using at least two ML models from the subset of ML models.

18. The non-transitory processor-readable medium of claim 17, wherein the instructions comprising code to cause the processor to identify the subset of vectors includes code to cause the processor to:
identify, for each vector from the set of vectors, a vector from the plurality of vectors most similar to that vector, the vector most similar to that vector associated with at least one ML model that is from the plurality of ML models and included in the subset of ML models.

19. The non-transitory processor-readable medium of claim 17, wherein the set of vectors is a first set of vectors and the instructions further comprise code to cause the processor to:
generate a second set of vectors based on the request before generating the first set of vectors; and identify, based on an importance associated with each vector from the second set of vectors, the first set of vectors as a subset of vectors from the second set of vectors.

20. The non-transitory processor-readable medium of claim 17, wherein a number of ML models included in the at least two ML models is less than a number of ML models included in the subset of ML models, and the instructions further comprise code to cause the processor to:
identify the at least two ML models from the subset of ML models based on the set of vectors.

21. An apparatus, comprising:
a memory; and
a processor operatively coupled to the memory, the processor configured to:
receive a representation of a request;
identify at least one of a set of state features or a set of vectors associated with the request;
filter a model storage that includes a plurality of machine learning (ML) models to identify a subset of ML models included in the model storage, each ML model from the subset of ML models associated with at least one of (1) at least one state feature from the set of state features or (2) at least one vector from the set of vectors, an ML model from the plurality of ML models trained using a process that includes:
receiving training data;
validating the training data;
randomizing, after validating the training data, the training data to generate randomized training data; and
training the ML model based on the randomized training data; and
cause, to generate an output, the request to be processed using the subset of ML models and not remaining ML models from the model storage.

22. The apparatus of claim 21, wherein
the model storage includes a set of ML models stored at a remote compute device; and
filtering the model storage includes filtering the set of ML models based on metadata associated with the set of ML models, the set of ML models accessible via an application programming interface (API).

* * * * *